Figure 1:
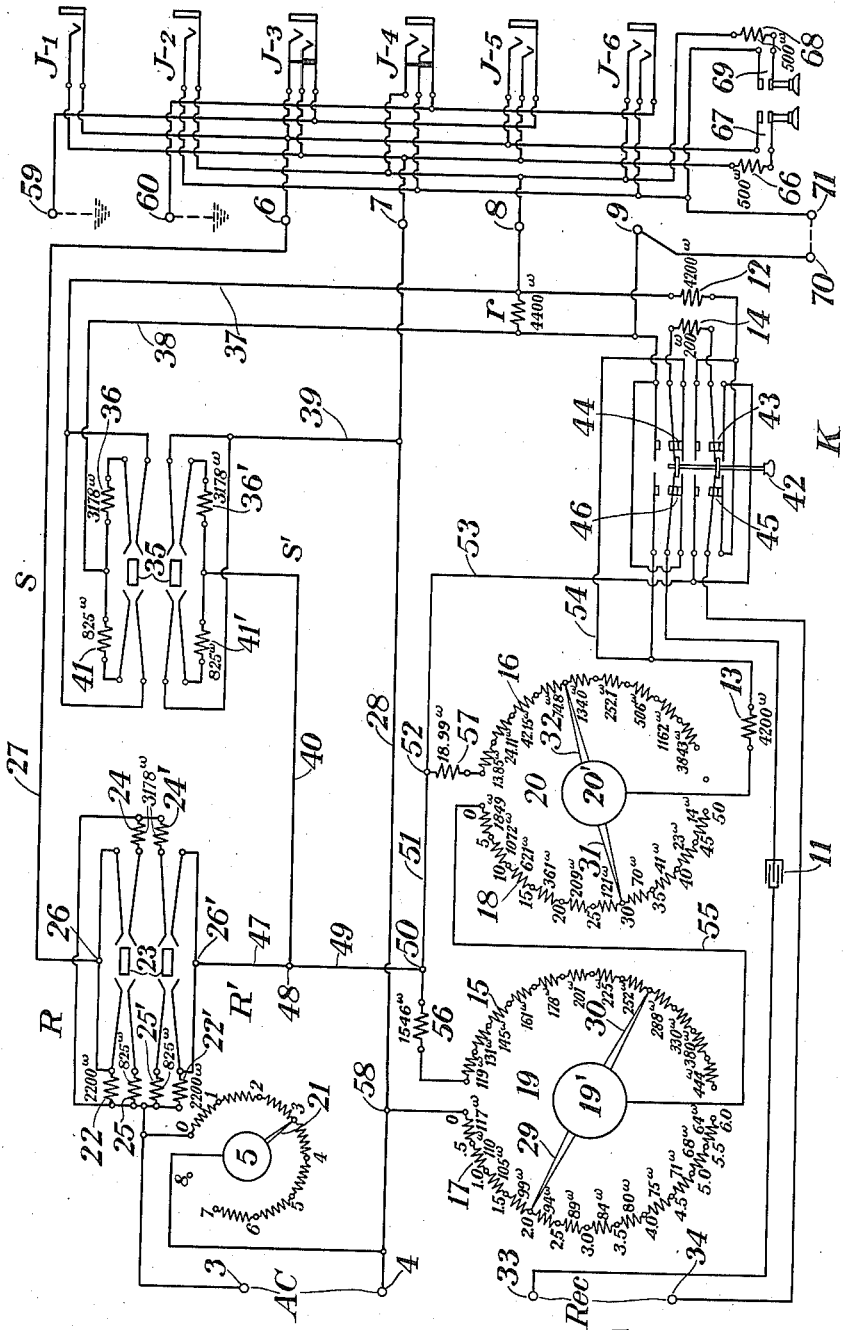

O. B. BLACKWELL.
TESTING APPARATUS.
APPLICATION FILED OCT. 2, 1916.

1,261,096.

Patented Apr. 2, 1918.
3 SHEETS—SHEET 2.

Inventor:
Otto B. Blackwell
per Thomas D. Lockwood
Attorney.

O. B. BLACKWELL.
TESTING APPARATUS.
APPLICATION FILED OCT. 2, 1916.
1,261,096.
Patented Apr. 2, 1918.
3 SHEETS—SHEET 3.
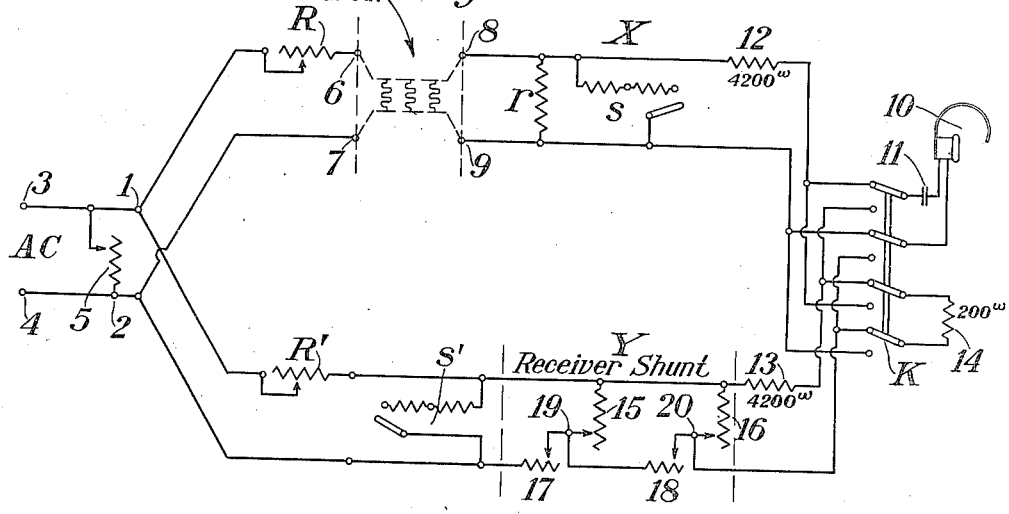
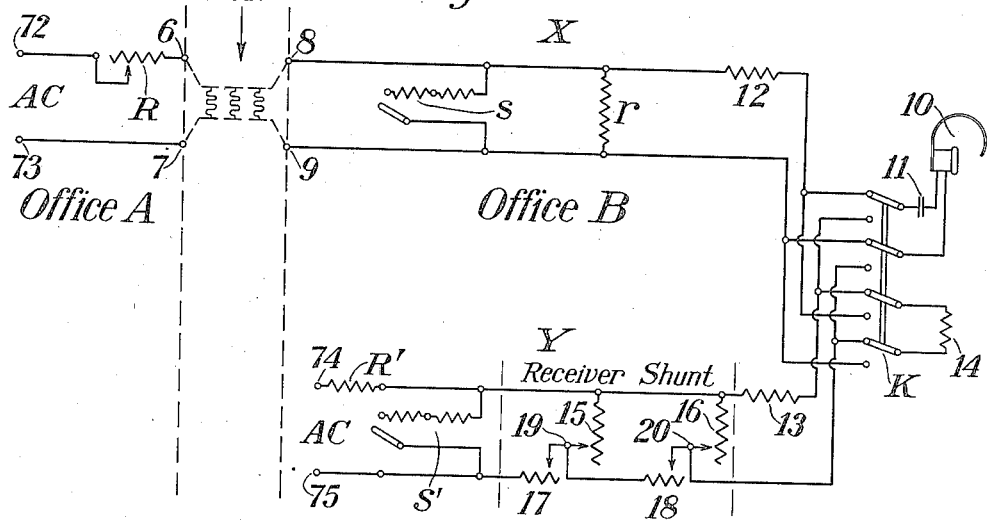
*Inventor:*
Otto B. Blackwell
per Thomas D. Lockwood
*Attorney.*

UNITED STATES PATENT OFFICE.

OTTO B. BLACKWELL, OF MAPLEWOOD, NEW JERSEY, ASSIGNOR TO AMERICAN TELEPHONE AND TELEGRAPH COMPANY, A CORPORATION OF NEW YORK.

TESTING APPARATUS.

1,261,096.      Specification of Letters Patent.      Patented Apr. 2, 1918.

Application filed October 2, 1916. Serial No. 123,371.

*To all whom it may concern:*

Be it known that I, OTTO B. BLACKWELL, residing at Maplewood, in the county of Essex and State of New Jersey, have invented certain Improvements in Testing Apparatus, of which the following is a specification.

This invention relates to testing apparatus and more particularly to an apparatus for determining the transmission losses occurring in electrical transmitting paths such as telephone circuits and apparatus, although the invention may have a greater range of utility. In testing telephone circuits, such as cord circuits and trunks to determine the transmission efficiency thereof, it is desirable that the circuit to be tested should be tested under conditions simulating those under which it is used in practice. For instance if a cord circuit or trunk is to be tested, it should be connected to impedances at each end which are approximately equal to the impedances of the lines to which it would be connected when used for talking purposes, and at the same time the various relays and other apparatus of which the cord circuit is composed should be in the condition which they would assume during actual conversation. On the other hand if the transmission of a line is to be tested, the line should be connected by impedances across its ends which approximate its own characteristic impedance in order to prevent reflection losses. These various characteristic conditions will vary with the nature of the apparatus, or circuit to be tested. It is one of the objects of this invention to provide a testing apparatus which shall include means to produce these various desirable conditions and in which the various elements necessary to carry out transmission tests on widely differing organizations, under the normal operating conditions of such organizations, may be combined in a single testing unit.

These results are accomplished in one form of the invention by providing two equivalent branched circuits which may be connected to a source of current variation adapted to produce a sound in a telephone receiver, the one circuit being provided with adjustable impedance elements between which the circuit to be tested may be connected, and the other circuit being provided with similar impedance elements and a variable resistance device so constructed that it may be adjusted to give the same transmission as the circuit in which the apparatus to be tested is included, and at the same time permit the impedance of the circuit to remain in its condition of equivalency to the first circuit. A telephone receiver may be connected at will to either circuit and the resistance varying device adjusted until the same sound is produced in the instrument over both circuits. By calibrating the dial or other means by which the resistance is varied in units of transmission loss, the transmission loss of the tested circuit for the particular source of current variation used in the test, may be read directly. This loss will vary, of course, with the different frequencies which make up voice currents. In making simple tests, however, the most used single frequency, say 800 cycles, can be chosen and the instrument calibrated to this frequency. When tests are required with other frequencies, the value read from the instrument can be corrected by a proper factor.

Figure 2:
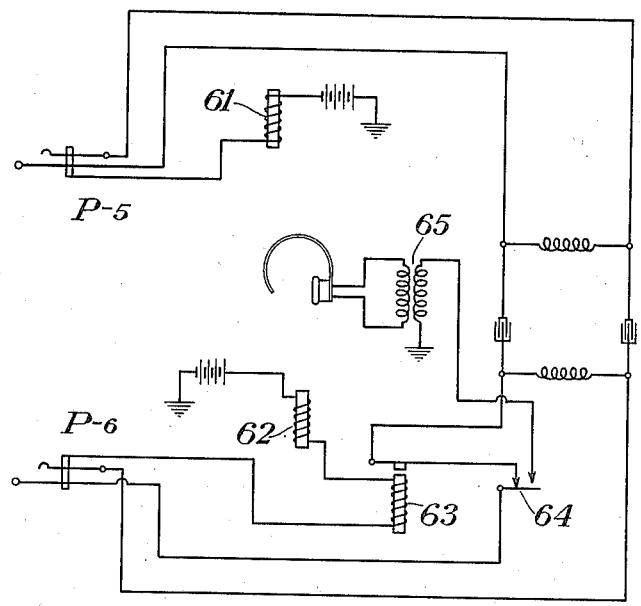
Figure 3:
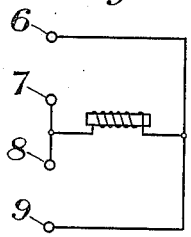
Figure 4:
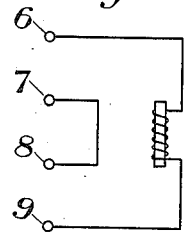

The invention will be more fully understood by reference to the accompanying drawings in which Figure 1 is a detailed diagram of the circuit connections of one form of the testing set, Fig. 2 is a diagram of a cord circuit whose transmission loss is to be tested by the apparatus of Fig. 1, Figs. 3 and 4 are diagrams showing how to connect a relay to determine its loss either in parallel or in series with a line, while Figs. 5 and 6 are simplified diagrams of two different modifications of the testing set.

Referring to the simplified diagram of Fig. 5, X and Y designate generally a pair of artificial lines branched in parallel from terminals 1 and 2, from which leads extend to terminals 3 and 4 to which a suitable source of alternating current may be connected, a source having a frequency of eight hundred cycles per second having been found very satisfactory for this purpose. A variable resistance 5 is bridged across the alternating current source and may be adjusted to give any desired amplitude to the voltage impressed upon the two parallel circuits X and Y. The circuit X is provided with two pairs of terminals 6—7 and 8—9 to which the two ends of the cord circuit or other circuit to be tested may be connected.

In order to simulate the impedance condition of the line to which in practice the cord circuit would be connected, a variable resistance R is provided which is serially connected to the terminal 6. A similar resistance R' is provided in the branch circuit Y. These resistances are so constructed that they may be adjusted to have different values say 600, 1300 and 2200 ohms, to correspond to low, medium and high impedance lines.

A telephone receiver 10 and condenser 11 may be serially connected across the terminals 8 and 9, the purpose of the condenser being to prevent the flow of direct current through the receiver in case a battery should be bridged across the circuit to be tested. A 4200 ohm resistance 12 is connected in series with receiver 10 and condenser 11, while in the branch circuit Y a similar 4200 ohm resistance 13 and a 200 ohm resistance 14 are serially included, the latter corresponding to the effective resistance of the receiver 10 and condenser 11.

In the circuit X a resistance $r$ of 4400 ohms is connected in parallel with the receiver 10, condenser 11 and resistance 12, which it will be noted have a combined resistance of 4400 ohms. These two parallel resistances of 4400 ohms give an effective resistance between terminals 8 and 9 of 2200 ohms, which correspond to the high impedance value to which resistance R may be set.

It will be noted that the impedances across terminals 8 and 9 are produced by resistances in shunt, while similar impedances are arranged with respect to terminals 6 and 7 by resistances in series. The shunt arrangement is used with respect to terminals 8 and 9, so that the telephone receiver shall at all times be in series with a large resistance. In this way any variation in the impedance of the receiver causes a very small variation in the total impedance across terminals 8 and 9, whereas, if series resistance had been used variation in the impedance of the receiver might cause a large variation in the impedance across terminals 8 and 9, particularly for the 600 ohm value of this impedance.

If a cord circuit which is to be used with medium or low impedance lines is to be tested and resistance R is accordingly adjusted to have a value of 1300 or 600 ohms the effective resistance of 2200 ohms between terminals 8 and 9 may be shunted by a variable resistance $s$ so that the impedance across terminals 8 and 9 will be equal to that of resistance R, whereby the tested circuit is connected in circuits having the approximate impedance values of the lines with which it is normally used. Similarly, if a line is to be tested, the impedance which is connected across its ends in the testing circuit may be adjusted to a value approximating the characteristic impedance of the tested line, whereby transmission losses due to reflection currents may be eliminated so that the testing set will register approximately the actual transmission loss due to the line itself, instead of this loss augmented by reflection losses.

In some cases it may be desirable to test a cord circuit or line which normally is connected to different impedances in the two directions. In this case the switches in the set may be thrown so as to connect different impedances to the two ends of the circuit or line to approximate the normal impedance conditions.

In branch circuit Y an apparatus known as a receiver shunt is connected. This apparatus comprises two variable resistances 15 and 16 bridged across the circuit Y and two variable series resistances 17 and 18. These resistances are controlled by dials 19 and 20 and the resistances are so constructed and the dials so arranged that no matter to what adjustment the dials may be set, the receiver shunt has a resistance of 4400 ohms in parallel to the combined resistance of 4400 ohms due to the resistances 13 and 14. This it will be seen gives two resistances of 4400 ohms in parallel, or an effective resistance of 2200 ohms at the right hand side of circuit Y, corresponding to the high impedance line conditions to which resistance R' may be adjusted. If a medium or low impedance of 1300 or 600 ohms is desired, a variable resistance $s'$ similar to resistance $s$ may be cut across the circuit Y in parallel to the resistance of 2200 ohms due to the receiver shunt and the resistances 13 and 14. The dial 20 is calibrated in units of transmission loss, each step representing a transmission loss of five miles of standard cable for a frequency of 800 cycles per second. The dial 19 is similarly calibrated to give half mile steps up to six miles, so that for any setting of the dials a transmission loss to within a half mile is indicated.

In testing a cord circuit or other piece of apparatus, it is connected to terminals 6, 7, 8 and 9 of branch X and the resistances R and R' adjusted to the approximate impedance with which the cord circuit is ordinarily associated, the shunts $s$ and $s'$ being at the same time adjusted to give the same impedance at the other end of the cord circuit. The dials 19 and 20 of the receiver shunt are then adjusted so that the current alternations from the alternating current source have the same amplitude in both circuits X and Y, which will occur when both circuits have the same transmission loss. This condition can be determined by comparing the sound in the receiver when connected alternately to each of the two circuits the receiver 10 and equivalent resistance 14 being capable of transposition from one circuit to the other by means of a suitable switch K. When the sound in the receiver is the same for both circuits, the transmission loss may be read on the dials as adjusted, the dials being calibrated in terms of transmission loss.

Referring now to Fig. 1 it will be seen that the variable resistance 5 comprises a dial which may be adjusted to any one of nine positions designated by dial numerals 0 to 8 inclusive. When the contact wiper 21 of the dial rests on the zero position there is a dead short circuit across the alternating current source, and no energy passes into circuits X and Y. As the dial is moved to succeeding positions increments of resistance are cut in until in the position designated 8 the shunt is open circuited and the full energy passes into circuits X and Y.

The variable resistance elements R and R' are shown in Fig. 1 as consisting of 2200 ohm resistances 22 and 22' respectively, said resistances being normally serially included in branches leading from terminal 3 to terminals 26 and 26' respectively. This arrangement corresponds to the high impedance condition. By throwing a key 23 to the right the resistances 22 and 22' are each shunted by 3178 ohm resistances 24 and 24' respectively, bringing the effective impedance to the medium value of 1300 ohms. By throwing the key to the left the 2200 ohm resistances are shunted by 825 ohm resistances 25 and 25' respectively, thus bringing the impedance to its low value of 600 ohms. From terminal 26 a conductor 27 leads to terminal 6, while a conductor 28 leads from terminal 4 to terminal 7.

The receiver shunt as shown in Fig. 1 comprises a pair of dial members 19 and 20. Dial 19 is provided with a pair of wipers 29 and 30. As the dial is rotated wiper 29 cuts in sections of resistance 17 having the value designated on the drawing, said resistance being serially included in circuit with terminal 4. At the same time wiper 30 cuts out a sufficient amount of shunt resistance 15 so that the effective impedance of the receiver shunt shall remain constant. Similarly dial 20 is provided with wipers 31 and 32, wiper 31 cutting in sections of series resistance 18, while wiper 32 cuts out a corresponding amount of shunt resistance 16. Dial 20 is graduated from 0 to 50, and is calibrated to read in units of transmission loss. When wiper 31 is resting on the contact corresponding to 30 a transmission loss of thirty miles of standard cable is indicated. Similarly dial 19 is graduated in half mile steps up to six miles. With the two dials 19 and 20 set as in the drawing a transmission loss of thirty-two miles of standard cable is indicated.

The resistance r of 4400 ohms is shown as shunted across contacts 8 and 9, in parallel to 4200 ohm resistance 12 and condenser 11 and a receiver which may be connected to terminals 33 and 34. The resistance r of 4400 ohms, in parallel with resistance 12, the receiver and condenser 11, having a combined resistance of 4400 ohms, gives a resulting resistance of 2200 ohms corresponding to a high impedance line. The apparatus designated generally by the reference characters s and s' in Fig. 5 is more specifically shown in Fig. 1 and comprises a key 35 and a number of resistance elements under the control of said key. Resistance elements 36 and 41 correspond to the resistance elements indicated at s in Fig. 5, while 36' and 41' indicate the similar elements indicated at s'. By throwing key 35 to the right a resistance 36 of 3178 ohms is thrown in parallel to the resistance of 2200 ohms by means of leads 37 and 38, reducing the impedance to 1300 ohms corresponding to a medium impedance line. At the same time 3178 ohm resistance 36' is thrown in shunt of the receiver shunt apparatus 19—20, by means of leads 39 and 40. The receiver shunt apparatus, when given the proportions shown in Fig. 1 will give a constant effective impedance in circuit Y as viewed from a point just to the left of the receiver shunt (see Fig. 5) of 4400 ohms. This impedance being in parallel with an impedance of 4400 ohms due to 4200 ohm resistance 13 and 200 ohm resistance 14, gives an effective impedance, as viewed from the same point, of 2200 ohms, which corresponds to a high impedance line. Now when resistance 36' of 3178 ohms is shunted about this impedance by throwing key 35 to the right the impedance is reduced to 1300 ohms corresponding to a medium impedance line. By throwing the key 35 to the left the impedance of 2200 ohms in circuits X and Y is shunted by resistance 41 and 41' respectively, of 825 ohms, reducing the effective impedance to 600 ohms corresponding to a low impedance line.

A key K is provided, controlling contacts 43, 44, 45 and 46. With the contacts in the position shown in Fig. 1, the receiver and condenser 11 are connected in series with resistance 12 across circuit X the resistance 14 being in series with resistance 13 across circuit Y. When the key is depressed the contacts 43—46 shift to their alternate positions and the receiver and condenser 11 are connected in series with resistance 13 across circuit Y while resistance 14 is connected in series with resistance 12 across circuit X. This shift is made without changing the load on the generator as the resistance 14 is connected in series with resistance 12 across circuit X, the resistance 14 being equivalent to the receiver and condenser.

Circuit X may now be traced in Fig. 1 from contact 3 through resistance 22 (and if key 23 is shifted through resistance 24 or 25) to terminal 26, through conductor 27 to terminal 6, through the circuit to be tested to terminal 8, then through resistance 12, contact 45, to terminal 34, through the receiver, terminal 33, condenser 11, contact 46, to terminal 9, then back through the tested circuit to terminal 7 and thence over conductors 28 to terminal 4. The following bridges are connected across this circuit. The bridge through dial 5 connected across terminals 3 and 4. The bridge through 4400 ohm resistance $r$, connected across terminals 8 and 9, the resistance $r$ being in turn bridged by resistance 36 or 41 through leads 37 and 38 if key 35 is operated.

Circuit Y may be traced from terminal 3 through resistance 22' (if key 23 is operated the circuit passes in parallel through resistance 24' or 25') to terminal 26', conductor 47, terminal 48, conductor 49, terminal 50, conductor 51, terminal 52, conductor 53, contact 43, resistance 14, contact 44, conductor 54, resistance 13, handwheel 20', wiper 31, sections of resistance 18, conductor 55, handwheel 19', wiper 29, sections of resistance 17 to terminal 4. A bridge extends across this circuit from handwheel 19' through wiper 30, sections of resistance 15, 1546 ohm resistance 56 to terminal 50. A second bridge extends from handwheel 20', through wiper 32, sections of resistance 16, 18.99 ohm resistance 57 to terminal 52. If key 35 be thrown these bridges will be shunted in turn by a bridge traced from terminal 58, through conductors 28 and 39, resistance 36' or 41', conductor 40 to terminal 48.

In order to facilitate the connection of apparatus to be tested to the testing set a plurality of jacks $J^1$, $J^2$, $J^3$, $J^4$, $J^5$ and $J^6$ are provided, jacks $J^1$, $J^3$ and $J^5$ being multipled to terminals 6—7, while the other three jacks are multipled to terminals 8 and 9. The three pairs of jacks $J^1$ and $J^2$, $J^3$ and $J^4$, $J^5$ and $J^6$ are designed for use with three distinct and well known types of cord circuit plugs, jacks $J^1$ and $J^2$ being adapted to two conductor plugs while the other two pairs are adapted to three conductor plugs. With the latter type it is sometimes necessary to connect the sleeve of the plug of the cord circuit to battery or ground in order to place the circuit in talking condition. For this purpose the sleeves of the jacks $J^3$ and $J^5$ are multipled to a terminal 59 while $J^4$ and $J^6$ are multipled to terminal 60. These terminals may be connected to ground or battery as desired. In the instance shown they are grounded for coöperation with the cord circuit of Fig. 2. This cord circuit is of a well known type comprising plugs $P^5$ and $P^6$, sleeve relays 61 and 62, busy test relay 63 controlling contact 64 of the talking circuit as well as the busy test circuit for operator's talking set 65. Upon inserting plugs $P^5$ and $P^6$ into jacks $J^5$ and $J^6$ respectively, the terminals 59 and 60 being grounded, the circuits of the sleeve relays and the busy test relay are completed, energizing said relays whereby the busy test relay closes the talking circuit through contact 64.

In certain types of cord circuits relays are provided which automatically ring the called subscriber and cut off the ringing current and complete the talking circuit when the called subscriber responds and closes the bridge through his set. For use with such cord circuits resistances 66 and 68 and keys 67 and 69 are provided so that when the keys are closed the 500 ohm resistances are connected across terminals 6—7 and 8—9 thereby operating the ringing apparatus and the ringing cut off apparatus.

If it be desired to test the transmission loss due to a section of apparatus, such as a cord circuit relay for instance, its loss when connected across the line may be tested independently of the jacks by connecting it directly to the terminals 6, 7, 8 and 9 as shown in Fig. 3. To test it in series with the line the connection should be as shown in Fig. 4. This latter connection may be made with the aid of the plug and jack connections as follows:—

Suppose it is desired to test in series with the line a piece of apparatus normally bridged across a cord circuit. Terminals 70 and 71 should be disconnected and terminal 6 connected directly to terminal 9, while terminal 7 is directly connected to terminal 71. By inserting the plug of the cord circuit into jack $J^2$, $J^4$ or $J^6$ it will be seen that the apparatus bridged across the cord is in series with the line as follows:—

From the generator, conductor 27, terminal 6, direct connection to terminal 9, through contact 46, condenser 11, the receiver, contact 45 and resistance 12 to terminal 8, to the jack, ring conductor of cord circuit, through the apparatus bridged across the cord, the tip of the cord, and corresponding conductor of the jack, to terminal 71, and then by direct connection to terminal 7 and back to the generator.

The apparatus heretofore described is adapted to be arranged as a single unit inclosed in a suitable casing, although in practice the generator or other source of frequency may be a separate unit. With this arrangement it is only possible, however, to test loops which have both ends terminating in the same office, as is the case with a cord circuit. A trunk extending to another office could only be tested by connecting it to another trunk leading back to the first office, so that two ends of a loop would terminate at such office. This is sometimes unsatisfactory and to overcome this difficulty a modification shown schematically in Fig. 6 has been devised. Instead of arranging circuits X and Y as parallel branches from a common source these two circuits are entirely disconnected and have separate terminals 72—73 and 74—75 respectively. The apparatus is now divided into two units. At one office (designated A) will be a unit comprising any suitable means for applying to terminals 72 and 73 a definite alternating current voltage, together with means to regulate and determine the voltage applied. This unit may also comprise the variable resistance R and terminals 6 and 7, the resistance R being constructed as already described. At the other office (designated B) the artificial line Y is constructed in the same manner as described in connection with the first modification. To terminals 74 and 75 of this circuit a source of current identical with that at office A is connected. That portion of circuit X comprising terminals 8—9, series resistance 12, shunt resistance $r$ and variable shunt $s$, together with receiver 10, condenser 11 and resistance 14 is also included as part of the unit of apparatus located at office B, the various elements having the same function and being identical with the similar parts bearing the same reference characters in Fig. 5 already described.

In operation the trunk connecting offices A and B is connected at its ends to terminals 6—7 and 8—9 and the two sources of alternating current at the two offices being adjusted to give the same or approximately the same potential at terminals 72—73 and 74—75, an operator at office B may adjust the receiver shunt of circuit Y until the same sound is produced in receiver 10 when it is connected to circuit Y as when it is connected to circuit X. The receiver and resistance 14 may be interchanged with respect to circuits X and Y by means of a suitable switch or key K to determine the identity of the sound. The transmission loss will then appear from the setting of the dial of the receiver shunt.

It will be understood that the values of the various resistances as given, have been worked out to give the most satisfactory results for a test made under certain conditions, but that the resistances may be varied somewhat without material loss in efficiency. Similarly it is within the principle of the invention to use voice currents for testing purposes. It will be further understood that the electrical constants in general may be varied as may be necessary to suit the conditions under which the apparatus is to be used and that while the apparatus is shown as embodied in a certain specific form which has been found in practice to be quite satisfactory, it is capable of a varied and wide range of embodiment within the scope of the appended claims.

What is claimed is:

1. A system for determining transmission losses in electrical transmitting paths comprising a path to be tested, a second path, means to apply similar continuous potential variations to corresponding ends of said paths, indicating means adapted to be associated with the opposite ends of said paths and responsive to currents transmitted over said paths from said source, and means to vary the transmission efficiency of said second path by known amounts without varying the impedance.

2. A transmission measuring apparatus comprising means to simulate apparatus with which a device to be tested is ordinarily used, a source of testing current, and means to indicate the transmission efficiency of said device when associated with said first mentioned means.

3. A transmission measuring apparatus comprising means to simulate impedance conditions under which a piece of apparatus to be tested is used, a source of testing current, and means to indicate the transmission efficiency of the tested apparatus when associated with said first mentioned means.

4. A transmission measuring apparatus comprising a first circuit, impedance means in said circuit, a second circuit, impedance means in said second circuit, means to interconnect said circuits through an apparatus to be tested, means whereby a source of current may be applied to one of said circuits, means to adjust said impedance means to values corresponding to those with which the tested apparatus is ordinarily used, and means to indicate the transmission efficiency of said tested apparatus when connected to said circuits.

5. A transmission measuring apparatus comprising a first circuit, impedance means in said circuit, a second circuit, impedance means in said second circuit, means to interconnect said circuits through an apparatus to be tested, means whereby a source of fluctuating current may be applied to one of said circuits, means to adjust said impedance means to values with respect to the characteristic impedance of the tested circuit such that reflection losses will be substantially eliminated, and means to indicate the transmission efficiency of said tested apparatus when connected to said circuits.

6. A transmission measuring apparatus comprising a pair of circuits, one of said circuits being provided with means whereby an apparatus to be tested may be connected therein, impedance elements in said circuit at each side of said apparatus to be tested, the other of said circuits being provided with equivalent impedance elements, means to apply substantially equal potentials to each of said circuits, and adjustable means in the second circuit to vary the transmission efficiency of said circuit, whereby its transmission efficiency may be made substantially equal to that of the first circuit when the apparatus to be tested is included therein.

7. A transmission measuring apparatus comprising a pair of circuits, one of said circuits being provided with means whereby an apparatus to be tested may be connected therein, impedance elements in said circuit at each side of said apparatus to be tested, the other of said circuits being provided with equivalent impedance elements, means to apply substantially equal potentials to each of said circuits, and adjustable means in the second circuit to vary the transmission efficiency thereof and at the same time maintain the impedance constant.

8. A transmission measuring apparatus comprising a pair of circuits, one of said circuits being provided with means whereby an apparatus to be tested may be connected therein, impedance elements in said circuit at each side of said apparatus to be tested, the other of said circuits being provided with equivalent impedance elements, means to apply substantially equal potentials to each of said circuits, means in the second circuit comprising series and shunt resistance, means to simultaneously vary the series and shunt resistance in such manner as to produce variations in the transmission efficiency of said second circuit, and maintain the impedance thereof constant.

9. A transmission measuring apparatus comprising a pair of circuits, one of said circuits being provided with means whereby an apparatus to be tested may be connected therein, means to produce a definite impedance at one side of the apparatus to be tested, equivalent impedance means in the second circuit, means to produce an equal impedance in said first circuit across the other side of the apparatus to be tested, said means comprising a fixed resistance and another resistance in parallel therewith, a fixed resistance in the second circuit equal to said fixed resistance in said first circuit, means in said second circuit comprising variable resistance in series therewith and variable resistance in shunt therewith, and means for varying said resistances, thereby varying the transmission efficieny of said second circuit and at the same time maintaining a fixed impedance in parallel to said fixed resistance in said second circuit.

10. A transmission measuring apparatus comprising a pair of circuits, one of said circuits being provided with means whereby an apparatus to be tested may be connected therein, means to produce a definite impedance at one side of the apparatus to be tested, equivalent impedance means in the second circuit, means to produce an equal impedance in said first circuit across the other side of the apparatus to be tested, said means comprising a fixed resistance and another resistance in parallel therewith, a fixed resistance in the second circuit equal to said fixed resistance in said first circuit, means in said second circuit comprising variable resistance in series therewith and variable resistance in shunt therewith, means for varying said resistances, thereby varying the transmission efficiency of said second circuit and at the same time maintaining a fixed impedance in parallel to said fixed resistances in said second circuit, means to apply substantially equal fluctuating potentials to both of said circuits, means to determine when said second circuit is adjusted by said resistance varying means to give the same transmission as said first circuit when the apparatus to be tested is connected therein, and means associated with said resistance varying means to indicate by the adjustment of the resistance varying means the transmission loss due to the apparatus to be tested.

11. A transmission measuring apparatus comprising a pair of circuits, means to apply substantially equal fluctuating potentials to said circuits, one of said circuits being provided with means whereby an apparatus to be tested may be connected therein, adjustable impedance elements in said circuits at each side of said apparatus to be tested, the other of said circuits being provided with equivalent impedance elements, means whereby said impedance elements may be set at a value such that reflection losses may be substantially eliminated and the apparatus to be tested will be associated with impedances substantially equal to those with which it is associated in ordinary use, and adjustable means in the second circuit to vary the transmission efficiency thereof and at the same time maintain the impedances in the second circuit at their set values.

12. A transmission measuring apparatus comprising a pair of equivalent circuits, one of said circuits comprising means whereby an apparatus to be tested may be included therein, means to apply substantially equal fluctuating potentials to said circuits, means to detect said fluctuations for one of said circuits, and electrically equivalent means for the other circuit, means whereby the connection of said detecting means and said equivalent means may be transposed with respect to the two circuits, whereby the transmission of the two circuits may be compared, and means whereby the second circuit may be adjusted to give the same transmission as the first circuit.

13. A transmission measuring apparatus comprising a pair of equivalent circuits, one of said circuits comprising means whereby an apparatus to be tested may be included therein and artificial lines associated with each side of the apparatus to be tested, the other of said circuits comprising equivalent artificial lines, means to apply substantially equal fluctuating potentials to said circuits, means to detect said fluctuations for one of said circuits, and electrically equivalent means for the other circuit, means whereby the connection of said detecting means and said equivalent means may be transposed with respect to the two circuits, whereby the transmission of the two circuits may be compared, and means whereby the second circuit may be adjusted to give the same transmission as the first circuit.

14. A transmission measuring apparatus comprising means to connect an apparatus to be tested therein, means to produce a definite impedance at one side of said apparatus to be tested, means to produce an equivalent impedance at the other side thereof, comprising a fixed element of comparatively high resistance and a detecting device of comparatively low impedance in series, together with a resistance in parallel thereto, whereby relatively large variations in the impedance of the detecting device will produce comparatively small variations in the resultant impedance.

15. A transmission measuring apparatus comprising a circuit, testing means associated therewith, means to connect a cord circuit to be tested to said circuit, said connecting means including means whereby the various apparatus in said cord circuit is caused to assume the condition it assumes during an actual talking connection, upon said cord circuit being connected to said circuit through said connecting means.

16. A transmission measuring apparatus comprising a circuit, testing means associated therewith, means to connect thereto a cord circuit to be tested, said cord circuit being provided with automatic ringing apparatus, and means included in said first circuit, operable to cause said automatic ringing apparatus to assume the condition which it assumes during an actual talking connection.

17. A system for determining transmission losses in electrical transmitting paths comprising a path to be tested, a second path of known characteristics, means to apply similar continuous potential variations to corresponding ends of said paths, and indicating means adapted to be associated with the opposite ends of said paths and responsive to currents transmitted over said paths from said first mentioned ends.

18. The method of testing transmission which consists in impressing continuous potential variations upon one end of a test circuit of unknown characteristics, impressing the current variations transmitted over said circuit from said end and received therefrom at the other end upon an indicator, impressing similar variations upon a circuit of known characteristics, impressing the variations received from the latter circuit upon an indicator, and adjusting the known characteristics of the latter circuit until the same indication is given for both circuits.

In testimony whereof I have signed my name to this specification in the presence of two subscribing witnesses, this 29th day of September, 1916.

OTTO B. BLACKWELL.

Witnesses:
RALPH W. WOLF,
R. S. SUTLIFFE.